United States Patent [19]
Wittmer et al.

[11] Patent Number: 5,900,208
[45] Date of Patent: * May 4, 1999

[54] HIGH-TEMPERATURE FLOWABLE SINTERING BATH AND METHOD OF USING SAME

[75] Inventors: Dale E. Wittmer, Garbondale, Ill.; Charles W. Miller, Williamsville, N.Y.

[73] Assignee: Centorr/Vacuum Industries, Inc., Nashua, N.H.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/782,683
[22] Filed: Jan. 15, 1997

Related U.S. Application Data

[63] Continuation-in-part of application No. 08/541,711, Oct. 10, 1995, Pat. No. 5,648,042.

[51] Int. Cl.$^6$ ...................................................... F27D 3/00
[52] U.S. Cl. ........................... 266/44; 266/274; 432/239; 501/97; 419/56
[58] Field of Search ....................... 266/44, 274; 419/56, 419/57; 432/78, 239, 243, 143; 501/97, 98, 99

[56] References Cited

U.S. PATENT DOCUMENTS

| | | | |
|---|---|---|---|
| 3,762,014 | 10/1973 | Klein | 29/203 |
| 4,227,927 | 10/1980 | Black et al. | 419/57 |
| 4,597,564 | 7/1986 | Hanewald et al. | 266/274 |
| 5,162,098 | 11/1992 | Claar et al. | 419/57 |
| 5,187,130 | 2/1993 | Newkirk et al. | 501/97 |

OTHER PUBLICATIONS

Dale E. Wittmer, Joseph Conover and Vincent A. Knapp "Continuous and Batch Sintering of Silicon Nitride" vol. 72, No. 6, Jun. 1993.

Dale E. Wittmer and Charles W. Miller, Jr. "Comparison of Continuous Sintering to Batch Sintering of $Si_3N_4$", Ceramic Bulletin, vol. 70, No. 9, 1991.

*Primary Examiner*—Scott Kastler
*Attorney, Agent, or Firm*—Lappin & Kusmer LLP

[57] ABSTRACT

An apparatus and method for high-temperature precision sintering applications are disclosed wherein a flowable bed of a refractory particulate material is used to support an article during sintering to minimize distortions caused by shrinkage.

23 Claims, 1 Drawing Sheet

HIGH-TEMPERATURE FLOWABLE SINTERING BATH AND METHOD OF USING SAME

The present invention relates generally to improvements in high-temperature sintering and related applications for manufacturing components of varying shapes to precision specifications, more particularly to a flowable sintering bath to minimize distortions during processing.

CROSS-REFERENCE TO RELATED APPLICATIONS

This application is a continuation-in-part of U.S. patent application Ser. No. 08/541,711 filed Oct. 10, 1995, now U.S. Pat. No. 5,648,042, issued Jul. 15, 1997, directed to "High-Temperature Belt Furnace Apparatus and Method of Using Same," which application is commonly assigned herewith.

BACKGROUND OF THE INVENTION

High-temperature materials processing has become increasingly important as a technique for manufacturing many types of special performance industrial components. Precision shapes comprising a large variety of metallic and non-metallic materials selected for certain desirable performance characteristics are commonly manufactured using a high-temperature environment. For example, powder metallurgy is a familiar process for making a wide range of components and shapes from a variety of metals and alloys initially in powder form. The process utilizes pressure and heat to form the powders into precision shapes that require minimal secondary finishing.

In another familiar industrial application, one or a mixture of ceramic oxides and other ceramic-like compositions can be sintered to form a composite product of desired shape.. Although sintering occurs in loose powders, it is commonly enhanced by compacting the powder. In some applications, compacting is performed at room temperature, and the resulting compact is then sintered at elevated temperature without application of pressure. In other applications, a hot pressing process is used in which compacting is carried out at elevated temperature.

Typically, these and other types of high-temperature thermal processing operations are conducted in batch-style furnaces. More recently, there has been interest in continuous processing operations as a way to overcome some of the drawbacks of the batch furnace. Thus, U.S. Pat. No. 3,762,014 (Klein) describes a process for fabricating anode preforms by continuously sintering deposits of tantalum to a very thin tantalum foil strip utilizing a drive apparatus which is adjacent to but completely external of the furnace. The Klein apparatus comprises a continuous belt driven by rotating drums to carry the foil strip and deposits into a furnace maintained at a temperature of 1800° C.–2500° C. The belt speed is adjusted so that a given section of the foil strip remains inside the furnace sufficiently long (e.g. 1–60 minutes) for the sintering to be completed. While inside the furnace, the foil strip is supported on a stationary, horizontally-disposed, refractory support member (reference numeral 40 in FIG. 4 of the Klein patent). The continuous belt (reference numeral 31 in FIG. 4 of the Klein patent) never enters the sintering furnace (reference numeral 37).

A different approach to continuous sintering utilizes a belt furnace design in which articles to be heated, such as discrete shaped containers holding metal or ceramic powder, are placed on a continuous conveyer belt to be carried into, through and out of a furnace preheated to appropriate temperature. In general, such a belt furnace design for sintering silicon nitride is described in an article by Dale E. Wittmer et al. entitled "Continuous and Batch Sintering of Silicon Nitride" appearing in the *American Ceramic Society Bulletin*, vol. 72, no. 6 (June 1993) at pages 129–137, and in a second article by Dale E. Wittmer et al. entitled "Comparison of Continuous Sintering to Batch Sintering of $Si_3N_4$," appearing in *Ceramic Bulletin*, vol. 70, no. 9 (1991), both of which are incorporated herein by reference. U.S. patent application Ser. No. 08/541,711, now U.S. Pat. No. 5,648,042, of which this application is a continuation-in-part, is directed to an improved, multi-zone continuous belt-type furnace apparatus utilizing interlocking links of sintered silicon carbide especially designed for such high-temperature processing applications, and that disclosure is incorporated herein by reference.

In sintering, powder metallurgy and similar materials processing, articles and components of various shapes are produced by agglomeration of fine powders, typically under heat and pressure. These techniques are commonly employed where other methods of forming or shaping such articles, for example casting, forging and machining, are impractical or where special material properties are required. Sintering temperature is typically somewhat below the melting point of the powder. Depending on the material and required processing conditions, various techniques can be utilized to hold the particulates together in a desired shape while heat and/or pressure are applied.

Thus, for some applications, metallic powders or mixtures of metallic and nonmetallic powders are shaped by cold pressing at room temperature between steel dies or mold sections, which produces initial adhesion and shaping of the particles. In one common form of cold pressing, the shaping/compaction step is followed by heating the compacted particles to a suitable temperature in a nonoxidizing atmosphere, while retaining the article in the dies, to obtain final cohesion through sintering. The utility of this procedure is limited, however, to processing particulates which can be sintered at temperature below those at which the steel or other die material begins to soften and melt. Thus, this procedure cannot be used to sinter particulates such as various ceramic oxides, silicon nitride, and the like which require sintering temperatures well above the melting point of steel.

Regardless of the shape forming methods employed (i.e., cold pressed, extruded, injection molded, slip cast, thixotropic cast, gel cast, tape cast, or pressure cast), the potential for warpage of the part being formed during the sintering process exists if the part is not supported in some manner during the sintering operation. For simple geometries (e.g., rods, cylinders, tubes), the parts are conventionally held in v-grooves or semi-circular cradles during the sintering process. Parts with more complex geometries, however, cannot be sintered in a horizontal position with such fixtures. Attempts to use fixtures similar to those used for simple geometries for supporting shapes with complex geometries will result in undesirable shape distortion during sintering due to shrinkage and gravity effects. Typically parts with regular cross-sections but more complex geometries (e.g., flaired tubes, closed-end tubes and valves) are supported vertically on center rods or suspended from a collar or keeper. In this manner gravity aids in keeping the part straight during the densification which accompanies sintering. Even with this type of supporting system, however, warpage and part distortion can occur due to uneven heating of the parts. For parts with irregular cross-sections, these vertical support techniques are even less satisfactory.

These and other problems with and limitations of the prior art are overcome with the high-temperature flowable sintering bath of this invention.

OBJECTIVES OF THE INVENTION

Accordingly, a principal object of this invention is to provide an apparatus and method for minimizing shrinkage-related distortions during manufacture of high-temperature sintered articles.

It is a specific object of this invention to provide a high-temperature flowable sintering bath for heat-treatment processing at temperatures of about 1200° C.–2500° C.

It is also an object of this invention to provide improved means for supporting pre-shaped articles comprising sinterable ceramic or silicon nitride particles during the subsequent sintering process.

Another object of this invention is to provide support and shaping means for defining the shape of a sintered article during the heat treatment step while minimizing the volume and dimensions of the support and shaping structure.

Another object of this invention is to provide improved means for supporting a sintered article during processing at temperatures as high as about 2500° C.

Yet another object of this invention is to provide more uniform heating of the part being sintered through the intimate contact of the flowable bed with both the part and the sintering container.

Still another object of this invention is to provide apparatus for supporting a sinterable article having a complex geometry such that it cannot be adequately supported along any single axis through such article.

Specifically, it is an object of this invention to provide a refractory container of a flowable, refractory, inert particulate material to surround and support a pre-shaped sinterable article during sintering.

Other objects and advantages of the present invention will in part be obvious and will in part appear hereinafter. The invention accordingly comprises the apparatus and method, involving the various components and the several steps, and the relation and order of one or more of such components or steps with respect to each of the others, as exemplified in the following description and as illustrated by the drawings, or as would be apparent to those skilled in the art to which this invention pertains.

SUMMARY OF THE INVENTION

The improved, high-temperature sintering apparatus of this invention generally comprises a container made of a suitable refractory material and of suitable size and shape to accommodate a pre-shaped particulate article to be sintered. The container is filled in whole or in part with a flowable, refractory, substantially inert particulate material to form a flowable bath sufficient to surround and support the pre-shaped article during sintering. The container walls and the flowable particulate have melting points above the temperature required to sinter the pre-shaped article. The improved sintering method of this invention may be carried out in a batch, semi-batch or continuous process. The particulate article to be sintered is pre-shaped by suitable conventional means. The article is then submerged in the flowable bath, and the bath is subjected to heat treatment in a high-temperature furnace or the like for a suitable period of time to substantially complete sintering. The bath is then removed from the furnace, cooled, and the sintered article removed from the bath. The resulting product shows markedly reduced deformities, irregularities and warping as compared with conventional sintering techniques.

DETAILED DESCRIPTION OF PREFERRED EMBODIMENTS

Figure 1:
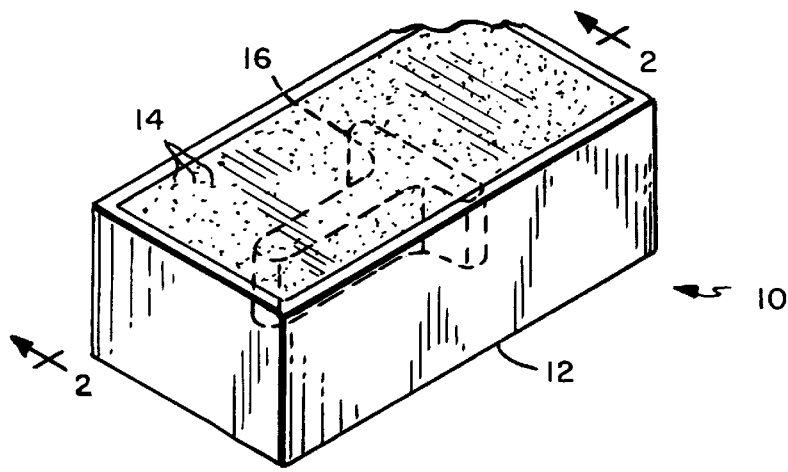
FIG. 1 is a schematic perspective view of a flowable sintering bath according to this invention containing a pre-shaped article to be sintered in accordance with the method of this invention.

As seen in FIG. 1, a flowable sintering bath 10 in accordance with the present invention broadly comprises container 12 at least partially filled with a flowable, refractory, substantially inert particulate material 14 so as to form a flowable bath. As shown in FIG. 1, container 12 is generally in the shape of a rectangular parallelepiped comprising four side walls, a bottom, and an open top for accessing the interior of the container.

The length, width and height dimensions of container 12 should be adequate to accommodate the corresponding dimensions of the pre-shaped particulate article 16 to be sintered, in general ranging from about 10–100% greater than the corresponding dimensions of the article. If the bath is too small, there may be insufficient flowable particulate material 14 to fill voids created by shrinkage during sintering, or the flow of the particulates into the voids may be unduly restricted by the walls of the container. On the other hand, minimizing the overall size of the sintering bath minimizes the amount of material that must be heated to the sintering temperature and also minimizes the size of the openings into and out of the furnace, thereby achieving thermal efficiencies. In any event, the overall size of the flowable bath of this invention, relative to the size of the article to be sintered, will generally be substantially less than the necessary size of the dies needed for conventional cold pressing and similar sintering techniques.

Although the rectangular parallelepiped configuration of container 12 as seen in FIG. 1 can readily accommodate a wide variety of regular and irregular article shapes, it will be understood that other geometrical configurations may be substituted as appropriate, depending on the shape of article to be sintered. For example, cube or non-rectangular parallelepiped (e.g. coffin-shaped) container configurations may be suitable for certain sintering applications. It is especially desirable, though not required, that the bottom face or side of the container be substantially flat so as to provide a stable resting surface for placing the filled container on a platform or conveyor belt for heat treatment.

Although cost and material considerations will generally dictate that the container walls also be substantially flat and of a regular shape (e.g. rectangular), it is within the scope of this invention to utilize containers having non-rectangular or irregularly-shaped walls, or even curved wall portions. Because the highly refractory materials that must be utilized to form the walls and sides of container 12 are typically brittle and difficult to form, shape or machine, however, it is believed that the rectangular parallelepiped configuration of FIG. 1 will normally be preferred.

As shown in FIG. 1, container 12 comprises an open top face which is used to access the interior of the container for adding or removing particulate material 14 and article 16. For some sintering applications, it may be desirable to utilize an appropriately sized and shaped top face (not illustrated) of highly refractive material to cover the opening of container means 12 during the heat treatment step. Such a cover or top face can be held in place for example by gravity. On completion of the sintering, the top face is lifted in order to remove the sintered article from the flowable bed of the container.

Container 12 may be fabricated from any highly refractory material that can be formed into a container sealed on all sides but one. As used in this application, the term "highly refractory" is meant to include all materials that remain structurally stable (i.e. do not melt, sublime, or otherwise deteriorate) at temperatures above 1200° C., preferably above 2000° C., and above the sintering temperature of the material comprising the article to be sintered. For example, containers of boron nitride are structurally stable up to about 2100° C.; and, in a non-oxidizing atmosphere, graphite containers can be used up to about 3400° C. In general, subject to the preceding qualifications, container 12 may consist essentially of any refractory metal or ceramic. Refractory metals suitable for container 12 include molybdenum and tungsten. Refractory ceramic materials suitable for container 12 include aluminum nitride, silicon nitride, silicon carbide, boron nitride, graphite, and composites made from mixtures of these materials.

Flowable particulate material 14 may similarly comprise any highly refractory material that can be formed into particles of a relatively homogeneous size and shape so as to exhibit good "flowability" characteristics. Depending on the particle shape, flowable particles in accordance with this invention may be as small as about 250 microns, if they are generally of spherical shape, and may be as large as a few millimeters, for example 2–5 millimeters. In a preferred embodiment, flowable particulate material 14 comprises substantially uniformly-sized particles having diameters in the range of about 0.25 to 0.50 mm. Boron nitride and certain forms of carbon are especially useful for the flowable particulate material, but other inert, flowable, refractory particulates are contemplated and are considered within the scope of this invention. For example, the flowable particulate material 14 may consist essentially of aluminum nitride, silicon nitride, silicon carbide, boron nitride, graphite, or composites made from mixtures of these materials.

In accordance with this invention, a pre-shaped article 16 of sinterable particles is submerged in a flowable bath of particles 14 contained within container 12. Container 12 and its contents are then heated to the sintering temperature of the material comprising article 16 and held at or near that temperature for a sufficient time to substantially complete the sintering process. Depending on the material comprising article 16 and the size of sintering bath 10, approximate sintering times can be computed by known means and optimized by routine experimentation. Heat treatment may be carried out in a conventional batch-type furnace or, alternatively, in a continuous-belt furnace as described in parent application Ser. No. 08/541,711, now U.S. Pat. No. 5,648,042. For example, article 50 shown in FIG. 1 of Ser. No. 08/541,711, now U.S. Pat. No. 5,648,042, may advantageously be container 12 of this invention containing flowable particulates 14 surrounding an article 16 to be sintered.

Figure 2:
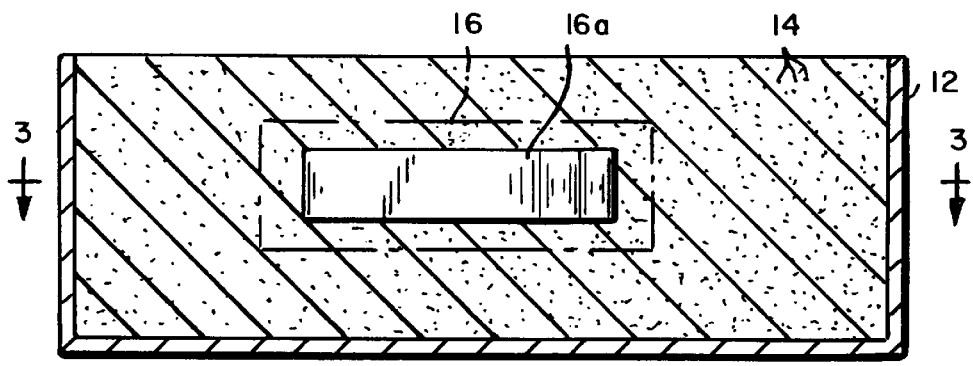
FIG. 2 is a side sectional view of the flowable sintering bath of FIG. 1 taken along the line 2—2.
Figure 3:
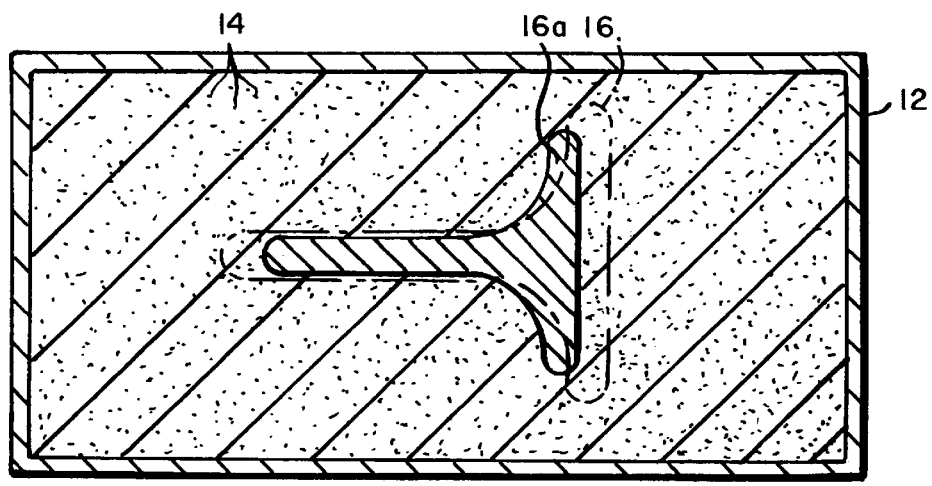
FIG. 3 is a top sectional view of the flowable sintering bath of FIG. 2 taken along the line 3—3.

During the sintering process, article 16 will experience shrinkage of as much as 15–20%, as is common in such processing. As shown in FIGS. 2 and 3, originally-sized article 16 will gradually shrink to a smaller-sized sintered article 16a during the heat treatment. In FIGS. 2 and 3, the original size of article 16 is depicted in dotted lines whereas the smaller sintered article 16a is depicted in solid lines. It will be understood that sintering, and the accompanying shrinkage of the article, occur gradually. As seen in FIGS. 2 and 3, however, as the article gradually shrinks during sintering, voids that would otherwise form adjacent the outer surface of the article leading to distortions and irregularities are almost immediately filled with the flowable particulate material 14 by action of gravity, thereby maintaining uniform support at every point along the lower surface of the article. In order to accommodate any initial thermal expansion of the article 16 and to help insure uniform filling of the bed of flowable particulate material 14 around article 16, the dimensions of the cavity defined by container 12 should be greater than the corresponding dimensions of the article being formed. Preferably, the dimensions of the cavity are at least about ten percent greater than the corresponding dimensions of the article being formed.

This invention is especially useful in sintering articles having at least one elongated axis. In these applications, the article is preferably positioned in the flowable sintering bath such that the elongated axis of the article is substantially horizontal. For example, utilizing the flowable sintering bath of this invention, silicon nitride valves for use in diesel engines have been prepared with as little as a $15/1000$ths of an inch tolerance along a component length of ten-twelve inches. By contrast, similar components of this size prepared according to conventional sintering techniques commonly show warping of as much as ¼–½ of an inch, sometimes as much as 1 inch, over a ten-twelve inch length. This severe warping in conventional sintering results from article shrinkage creating voids, combined with the action of gravity on the partial liquid phase of the material during sintering. In essence, the larger/heavier end of an elongated article "falls" into the void created by shrinkage thereby causing warping along the article's length.

One recent alternative approach to this problem, used in sintering simple elongated shafts, has been to employ a vertical gimble-type mounting in an effort to utilize gravity to try to keep the shaft true during sintering. Although this technique represents an improvement over conventional horizontal sintering, this alternative technique obviously cannot be used for sintering articles having a more complex, less symmetrical shape, such as article 16 in FIG. 1 of this invention. Only the method and apparatus of this invention is effective in supporting a sinterable article having a complex geometry such that it cannot be supported along any single axis of the article. Furthermore, our tests have shown that the flowable sintering bath of this invention results in better tolerances (less deformation) than the vertical mount approach even for simple shaft fabrications.

It will be understood that if article 16 has dimensions of several inches, such as six to twelve inches along its long dimensions, three to five inches along its width, and one to two inches in thickness, as for example in a valve for diesel engines, container 12, when loaded with flowable particulate material 14 and sinterable article 16, may weigh from several pounds to thirty or forty pounds or more. As discussed in copending parent application Ser. No. 08/541,711, now U.S. Pat. No. 5,648,042, loads of this magnitude cannot be processed in conventional continuous belt furnaces because the conventional belts cannot support loads greater than a few ounces at the high temperatures required for sintering applications.

At the same time, the high precision sintered parts produced utilizing the flowable beds of this invention often can benefit structurally from the closely controllable sequential heating and cooling zones of a continuous belt furnace. Accordingly, in at least some applications, various synergies can be realized and even higher performance sintered parts can be produced by combining the flowable sintering bed apparatus and method of this invention with the improved continuous belt furnace of Ser. No. 08/541,711 now U.S. Pat. No. 5,648,042. Thus, in this embodiment of the invention, container 12 loaded with flowable particulate material 14 and sinterable article 16 is heat treated in a multi-zone continuous belt furnace utilizing a continuous belt consisting essentially of interlocking links of sintered silicon carbide capable of supporting a load of about one-half pound or more at temperatures above 1200° C. without significant belt distortion.

Thus, in accordance with Ser. No. 08/541,711, now U.S. Pat. No. 5,648,042, an integrated system for carrying out high-temperature sintering of articles comprising one or a mixture of ceramic oxides and other ceramic-like compositions may include a furnace apparatus comprising in combination: (a) insulated housing means defining an interior compartment, said housing means further comprising inlet and outlet means; (b) at least a heating zone located in said interior compartment; (c) continuous belt means consisting essentially of interlocking links of sintered silicon carbide capable of supporting a load of about one-half pound or more without significant belt distortion at temperatures above about 1200° C., wherein said belt means enters said housing means through said inlet means, passes through said heating zone, and exits said housing means through said outlet means; and (d) variable-speed drive means for regulating the speed of said belt means.

Carrying out a sintering process according to this invention utilizing the furnace apparatus of Ser. No. 08/541,711, now U.S. Pat. No. 5,648,042, would comprise the steps of: positioning an unmolded, preshaped article consisting essentially of sinterable ceramic or silicon nitride particles in a bath of refractory, flowable particulate material contained in a refractory vessel; placing the refractory vessel on a portion of a moving, continuous conveyer belt consisting essentially of interlocking links of sintered silicon carbide; passing said vessel and said belt portion at a controlled speed through a sequence of at least two progressively hotter heating zones so as to heat said article and said belt portion to a temperature above about 1200° C. in the hottest of said heating zones; and, passing said vessel and said belt portion at a controlled speed through a sequence of one or more progressively cooler heating zones, each maintained at a temperature intermediate between that of said hottest heating zone and ambient conditions so as to cool said article.

It will be apparent to those skilled in the art that other changes and modifications may be made in the above-described apparatus and method without departing from the scope of the invention herein, and it is intended that all matter contained in the above description shall be interpreted in an illustrative and not in a limiting sense.

Having described the invention, what we claim is:

1. A system for sintering an unmolded, preshaped article consisting essentially of sinterable ceramic or silicon nitride particles, said system comprising:
   (A) a high-temperature belt furnace comprising in combination:
   (1) insulated housing means defining an interior compartment, said housing means further comprising inlet and outlet means;
   (2) at least a heating zone located in said interior compartment;
   (3) continuous belt means consisting essentially of interlocking links of sintered silicon carbide capable of supporting a load of about one-half pound or more without significant belt distortion at temperatures above about 1200° C., wherein said belt means enters said housing means through said inlet means, passes through said heating zone, and exits said housing means through said outlet means; and
   (4) variable-speed drive means for regulating the speed of said belt means; and,
   (B) a load positioned on said belt means, said load comprising a refractory container defining a cavity, said cavity containing a bed of inert, refractory, flowable particulate material and an unmolded, preshaped article consisting essentially of sinterable ceramic or silicon nitride particles.

2. A system according to claim 1 wherein said container consists essentially of a metal selected from the group consisting of molybdenum, tungsten, and mixtures thereof.

3. A system according to claim 1 wherein said container consists essentially of a substance selected from the group consisting of aluminum nitride, silicon nitride, silicon carbide, boron nitride, graphite, and composites made from mixtures thereof.

4. A system according to claim 1 wherein said container comprises a substantially flat bottom face and side walls.

5. A system according to claim 1 wherein said container has a parallelepiped configuration.

6. A system according to claim 1 wherein said container has a rectangular parallelepiped configuration.

7. A system according to claim 1 wherein said particulate material comprises substantially uniformly-sized particles.

8. A system according to claim 1 wherein said particulate material comprises particles having an average diameter of about 250 microns to 5 mm.

9. A system according to claim 1 wherein said particulate material consists essentially of particles having diameters in the range of about 0.25 to 0.50 mm.

10. A system according to claim 1 wherein said particulate material consists essentially of boron nitride.

11. A method of high-temperature sintering of an unmolded, preshaped, sinterable article consisting essentially of sinterable ceramic or silicon nitride particles, said article having an external surface which shrinks during sintering, so that the article maintains its shape substantially without distortion throughout the sintering process, said method comprising the steps of: preparing a sintering bath of an inert, refractory, flowable particulate material contained in a refractory vessel large enough to accommodate said unmolded, preshaped, sinterable ceramic or silicon nitride article; positioning said article in said bath of particulate material such that said article is substantially surrounded by said particulate material and the external surface of the article is in direct physical contact with said particulate material; heating said bath and said article to the sintering temperature for a time sufficient to substantially complete sintering while maintaining direct, physical, and inert contact between said particulate material and the shrinking external surface of said article; and, removing said article from said vessel.

12. A method according to claim 11 further comprising the step of cooling said bath before removing said article.

13. A method according to claim 11 wherein said article has an elongated axis in at least one direction and is positioned in said bed such that said elongated axis is substantially horizontal.

14. A method according to claim 11 wherein said particulate material comprises particles of substantially uniform size.

15. A method according to claim 11 wherein said particulate material comprises particles having an average diameter of about 250 microns to 5 mm.

16. A method according to claim 11 wherein said refractory vessel consists essentially of a metal selected from the group consisting of molybdenum, tungsten, and mixtures thereof, or a substance selected from the group consisting of aluminum nitride, silicon nitride, silicon carbide, boron nitride, graphite, and composites made from mixtures thereof.

17. A method according to claim 11 wherein said particulate material consists essentially of a substance selected from the group consisting of aluminum nitride, silicon nitride, silicon carbide, boron nitride, graphite, and composites made from mixtures thereof.

18. A method according to claim 11 further wherein said heating step is carried out in a multi-zone, continuous belt furnace.

19. A method according to claim 12 further wherein said heating and cooling steps are carried out in a multi-zone, continuous belt furnace.

20. A method according to claim 19 further wherein the continuous belt of said continuous belt furnace consists essentially of interlocking links of sintered silicon carbide capable of supporting a load of about one-half pound or more at temperatures above 1200° C. without significant belt distortion.

21. A method of thermally treating an unmolded, preshaped article consisting essentially of sinterable ceramic or silicon nitride particles at temperatures above about 1200° C. comprising the steps of: positioning said unmolded, preshaped article in a bath of inert, refractory, flowable particulate material contained in a refractory vessel; placing said refractory vessel containing said article on a portion of a moving, continuous conveyer belt consisting essentially of interlocking links of sintered silicon carbide; passing said vessel and said belt portion at a controlled speed through a sequence of at least two progressively hotter heating zones so as to heat said article and said belt portion to a temperature above about 1200° C. in the hottest of said heating zones; and, passing said vessel and said belt portion at a controlled speed through a sequence of one or more progressively cooler heating zones, each maintained at a temperature intermediate between that of said hottest heating zone and ambient conditions so as to cool said article.

22. A method of high-temperature sintering of an unmolded, preshaped sinterable article consisting essentially of sinterable ceramic or silicon nitride particles, said method comprising the steps of: preparing a sintering bath of an inert, refractory, flowable particulate material, consisting essentially of particles having diameters in the range of about 0.25 to 0.50 mm., contained in a refractory vessel large enough to accommodate said unmolded, preshaped, sinterable ceramic or silicon nitride article; positioning said article in said bath of particulate material; heating said bath and said article to the sintering temperature for a time sufficient to substantially complete sintering; and, removing said article from said vessel.

23. An article of manufacture having a complex geometry such that it cannot be adequately supported alone any single axis through such article and consisting essentially of sintered ceramic or silicon nitride particles, said article being prepared by the method of: preparing a sintering bath of an inert, refractory, flowable particulate material contained in a refractory vessel; positioning an unmolded, preshaped structure having said complex geometry and consisting essentially of sinterable ceramic or silicon nitride particles in said bath of particulate materials; heating said bath and said structure to the sintering temperature for a time sufficient to substantially complete sintering, causing the structure and its external surface to shrink, while maintaining direct, physical, and inert contact between said particulate material and the shrinking external surface of said structure; and, removing the sintered structure from said sintering bath.

* * * * *

UNITED STATES PATENT AND TRADEMARK OFFICE
CERTIFICATE OF CORRECTION

PATENT NO.: 5,900,208

DATED: May 4, 1999

INVENTOR(S): Dale E. Wittmer et al.

It is certified that error appears in the above-identified patent and that said Letters Patent is hereby corrected as shown below:

Claim 23, column 10, line 22, delete "alone" and substitute therefor -- along --.

Signed and Sealed this

Twelfth Day of October, 1999

*Attest:*

Q. TODD DICKINSON

*Attesting Officer*    *Acting Commissioner of Patents and Trademarks*

UNITED STATES PATENT AND TRADEMARK OFFICE
CERTIFICATE OF CORRECTION

PATENT NO. : 5,900,208

DATED : May 4, 1999

INVENTOR(S) : Dale E. Wittmer et al.

It is certified that error appears in the above-identified patent and that said Letters Patent is hereby corrected as shown below:

Column 1, line 10, insert,

-- STATEMENT REGARDING FEDERALLY SPONSORED RESEARCH

The Government of the United States of America has rights in this invention pursuant to Subcontract No. 86X-SP234C, under Contract DE-AC05-84OR21400, by or for the U.S. Department of Energy. --

Signed and Sealed this

Eleventh Day of July, 2000

Attest:

Q. TODD DICKINSON

*Attesting Officer*    *Director of Patents and Trademarks*